United States Patent [19]

Freeman et al.

[11] Patent Number: 5,119,896
[45] Date of Patent: Jun. 9, 1992

[54] LOAD CELL SUPPORTING MEMBER AND WEIGHING SCALE INCORPORATING THE SAME

[75] Inventors: Gerald C. Freeman, Norwalk; Norman Lilly, Stratford, both of Conn.

[73] Assignee: Pitney Bowes Inc., Stamford, Conn.

[21] Appl. No.: 745,304

[22] Filed: Aug. 15, 1991

Related U.S. Application Data

[62] Division of Ser. No. 551,374, Jul. 11, 1990.

[51] Int. Cl.$^5$ ............................................. G01G 21/28
[52] U.S. Cl. .................................................. 177/244
[58] Field of Search ............... 177/154, 180, 208, 211, 177/256

[56] References Cited

U.S. PATENT DOCUMENTS 4,058,179  11/1977  Price ................................. 177/156
4,278,139   7/1981  Caris ................................. 177/154

*Primary Examiner*—George H. Miller, Jr.
*Attorney, Agent, or Firm*—Robert H. Whisker; David E. Pitchenik; Melvin J. Scolnick

[57] ABSTRACT

A load cell supporting member includes a central portion formed to receive a load cell and to protect a load cell from overloading. A plurality of arms extends radially from the central portion. The supporting member is a single, integral piece of said material.

A weighing scale includes a first supporting member, a load cell supported by the first supporting member. The scale also includes a second supporting member, that is identical to the first and supported by the load cell and is identical to the first supporting member. The second supporting member supports a scale platform.

Another weighing scale includes three identical supporting members and two load cells. A first supporting member supports a first load cell. The first load cell supports a second supporting member, which supports a second load cell. The second load cell supports a third supporting member. The third supporting member supports a scale platform.

8 Claims, 6 Drawing Sheets

LOAD CELL SUPPORTING MEMBER AND WEIGHING SCALE INCORPORATING THE SAME

FIELD OF THE INVENTION

This invention relates to a member to be used for supporting a load cell as part of a weighing scale and to a weighing scale that incorporates such a member.

BACKGROUND OF THE INVENTION

A weighing scale commonly includes a base upon which a load cell is mounted. A platform for receiving a load is in turn mounted on the load cell. When a load is placed on the platform, the weight of the load causes deflection of one or more portions of the load cell. One or more strain gages produce electrical signals representative of the deflection. The signals are processed to generate data representing the weight of the load. For example, U.S. Pat. No. 4,143,727 discloses a scale of this type The platform, base, and other structural elements of the scale must be sufficiently strong and rigid to support loads placed on the scale without failing or greatly deforming.

Further, as discussed in U.S. Pat. No. 4,479,561 (assigned to the assignee of this application, and the disclosure of which is incorporated herein by reference), it is desirable that the scale structure provide protection against the load cell being overloaded. It is further desirable that oscillation of the scale's structure be rapidly damped, so that an accurate reading may be quickly obtained.

It is accordingly desirable that the structural elements of a scale be designed to meet these requirements at low cost, with ease of manufacture and in a manner that allows flexibility in the overall design of a scale.

SUMMARY OF THE INVENTION

A load cell supporting member according to this invention includes a central portion that has structure for protecting a load cell. A plurality of arms extend radially from the central portion. The supporting member is a single, integral piece of solid material; e.g., a metal casting or a molded piece of plastic.

Each of the arms includes a distal end that has means for mounting a supporting leg. Each distal end also has a downstop member.

In accordance with one aspect of the subject invention, the protecting structure includes a walled perimeter that has means for mounting at least one down-stop screw. The central portion also comprises means for receiving a leveling bubble.

A weighing scale that incorporates the supporting member includes a first supporting member and a load cell supported by the supporting member. A second supporting member, identical to the first, is supported by the load cell. A platform is mounted on the second supporting member. A plurality of supporting legs are mounted to, and support, the first supporting member.

Another weighing scale that incorporates the supporting member includes a first supporting member and a first load cell supported by the supporting member. A second supporting member, identical to the first, is supported by the first load cell. A second load cell is supported by the second supporting member. A third supporting member, identical to the first and second, is supported by the second load cell. A platform is mounted on the third supporting member. A plurality of supporting legs are mounted to, and support, the first supporting member.

The supporting member and the scales of this invention provide a number of advantages, including ease in assembling the scale and reduction of the number of parts required for the scale. These and other advantages can be understood from the following description of the invention in conjunction with the drawings.

DETAILED DESCRIPTION OF THE PREFERRED EMBODIMENTS

Figure 1:
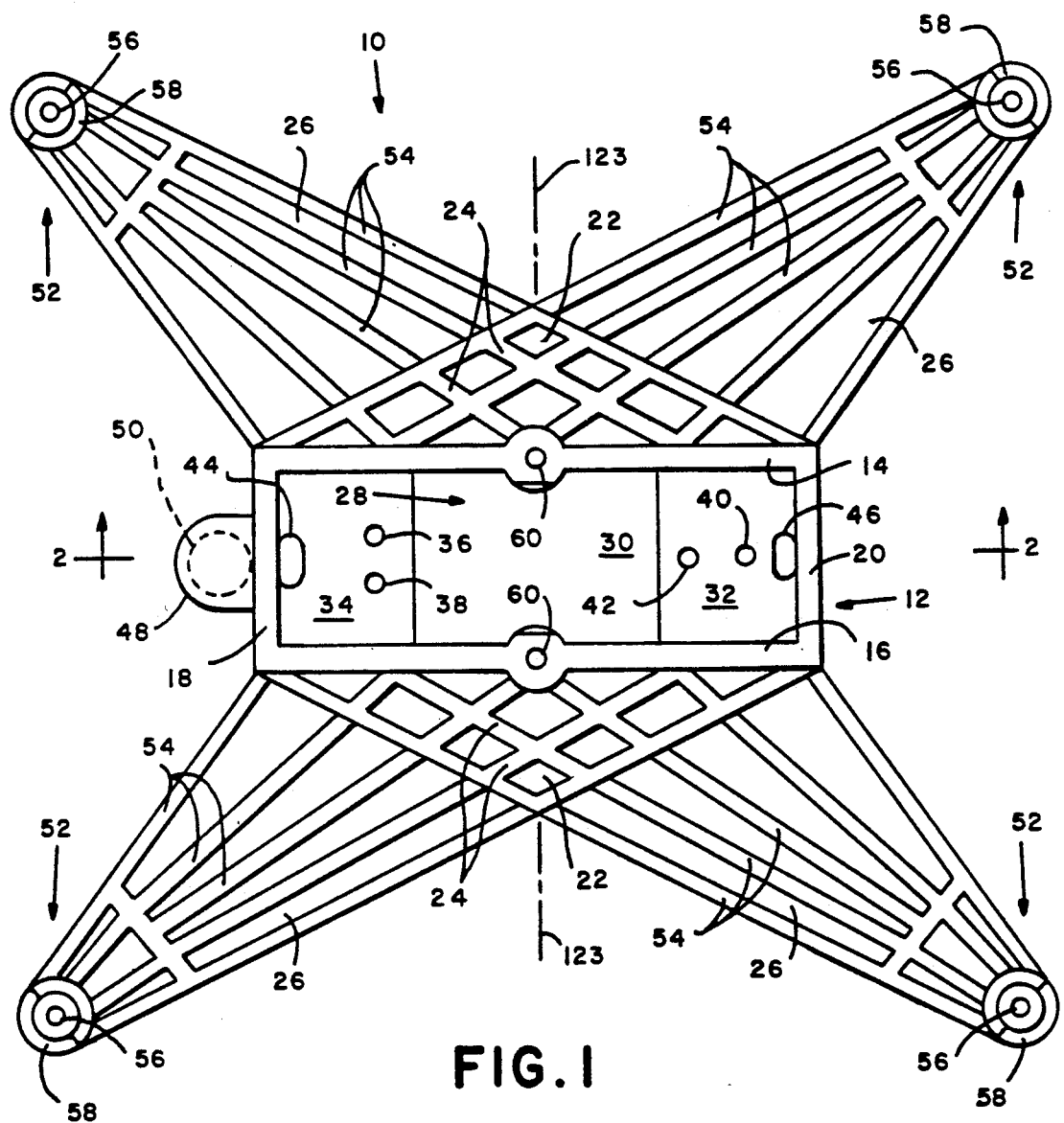
FIG. 1 is a plan view of a load cell supporting member in accordance with the invention.
Figure 2:
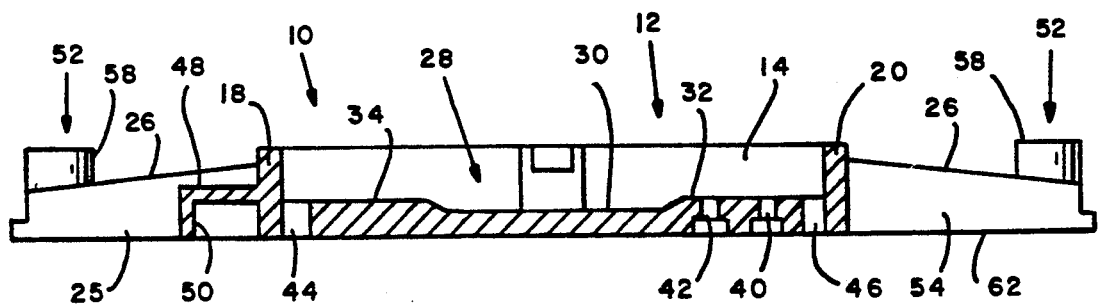
FIG. 2 is a sectional view taken on the line 2—2 of FIG. 1.

Referring to FIGS. 1 and 2, a load cell supporting member 10 includes generally rectangular central portion 12, which has long walls 14, 16 and short walls 18, 20. It will be noted that walls 14, 16, 18, 20 form a walled perimeter of central portion 12. Adjacent each of long walls 14, 16 is a triangular webbed portion 22 which includes webbing ridges 24. Two arms 26 extend from each webbed portion 22. The four arms 26 are arranged so as to extend radially from the center of central portion 12.

Central portion 12 includes a chamber 28 for receiving a load cell. Chamber 28 encompasses the space between walls 14, 16, 18, 20. The floor 30 of chamber 28 includes raised pads 32, 34. Pad 34 includes paired circular clearance holes 36, 38, and pad 32 includes paired circular clearance holes 40, 42. Elongate clearance holes 44, 46 are found respectively in pads 32, 34 and are respectively adjacent walls 18 and 20. Holes 36, 38, 40, 42, 44, 46 extend completely through floor 30 of chamber 28. As will be seen, circular holes 36, 38, or circular holes 40, 42, are for mounting a load cell to member 10. Elongate holes 44, 46 are to accommodate passage of electrical lead wires (not shown) from a load cell to scale electronics (not shown).

Receptacle 48 extends outwardly from wall 18 and includes cylindrical well 50. As indicated below, a leveling bubble may be installed in receptacle 48.

Each arm 26 has a distal end 52. Ribs 54 emerge from each webbed section 22 along the two arms 26 extending therefrom. The ribs 54 along each arm 26 converge at the distal end 52 of their respective arms 26. At least some of the ribs 54 are extensions of webbing ridges 24.

Each distal end 52 includes a tapped hole 56. Each distal end 52 also has a semicylindrical downstop member 58.

Midway between short walls 18, 20, both long walls 14, 16 include reinforced tapped holes 60, which may receive downstop screws, as will be discussed.

It will be noted that, except for well 50 and the various holes discussed above, lower surface 62 of member 10 is uninterrupted, and substantially flat and smooth.

Member 10 is preferably a single, relatively strong and rigid, integral piece, such as an aluminum casting or alternatively, a plastic molding comprising, for instance, a glass-reinforced plastic.

Figure 3:
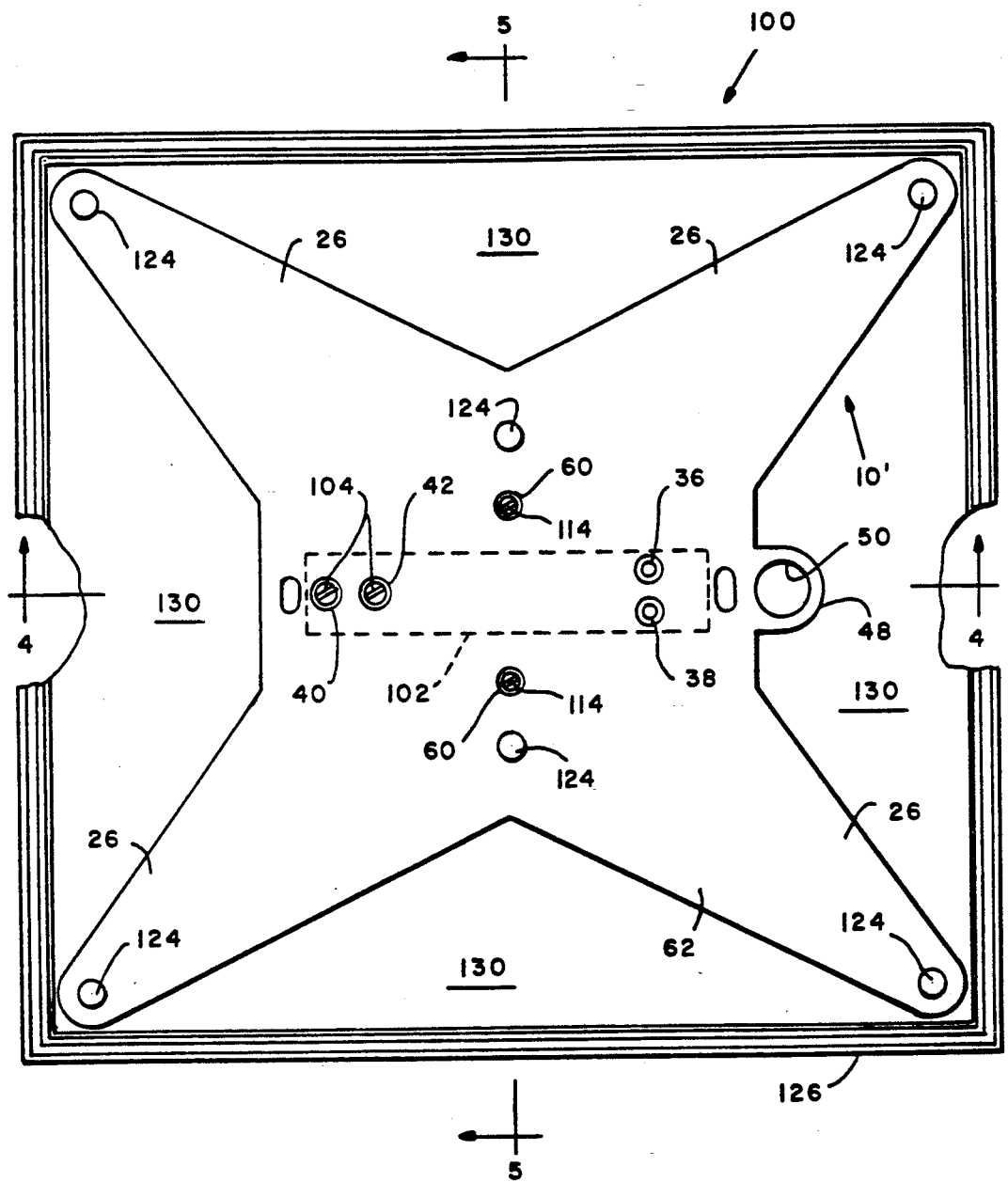
FIG. 3 is a plan view of a scale (without platform)
Figure 4:
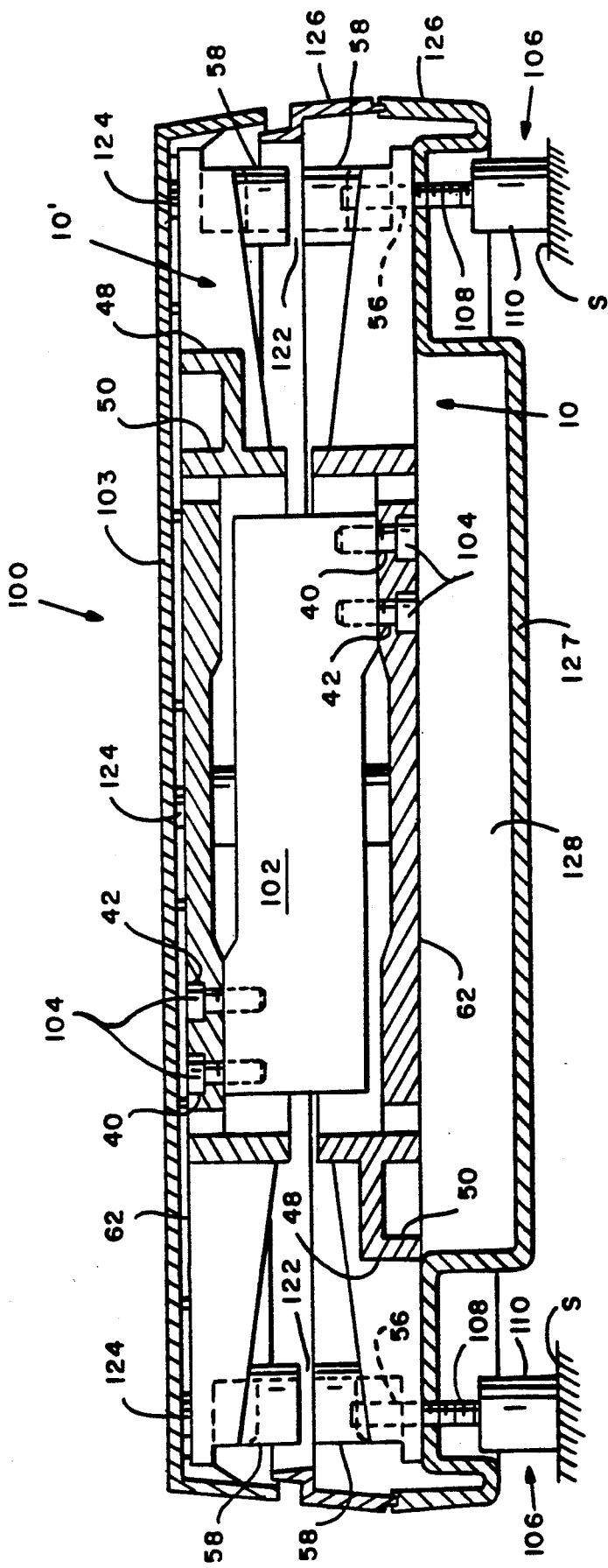
FIG. 4 is a sectional view of the scale (with platform) of FIG. 3, taken on the line 4—4 of FIG. 3.
Figure 5:
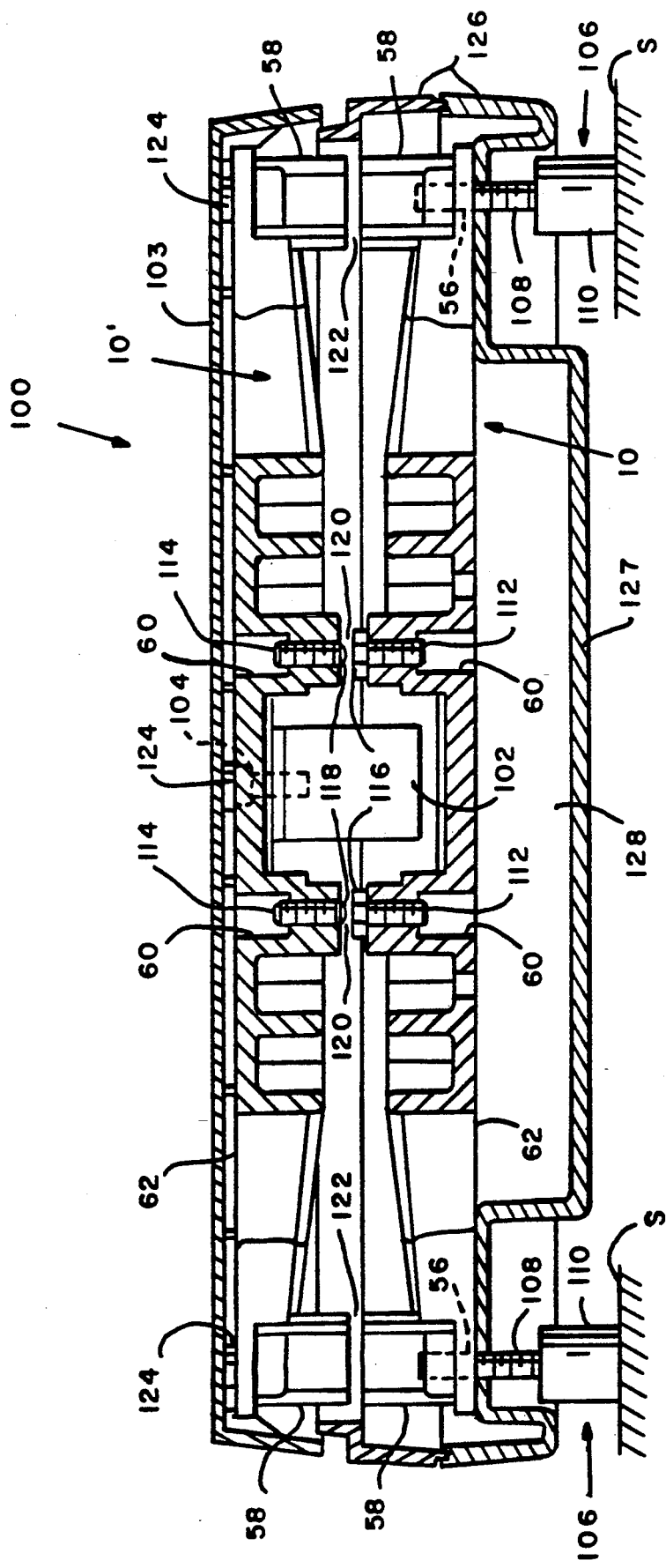
FIG. 5 is another sectional view of the scale (with platform) of FIG. 3, taken on the line 5—5 of FIG. 3.

Referring to FIGS. 3, 4, 5, weighing scale 100 includes a load cell supporting member 10. Member 10 supports load cell 102. Load cell 102 supports platform supporting member 10', which is identical to member 10. Platform supporting member 10' supports platform 103 (FIGS. 4, 5; not shown in FIG. 3). It will be observed from FIGS. 4, 5 that member 10 is oriented so that chamber 28 of member 10 opens upwardly, while the orientation of member 10' is inverted with respect to the orientation of member 10, so that chamber 28 of member 10' opens downwardly. Load cell 102 is for the most part enclosed within chambers 28 of members 10, 10'.

Load cell 102 is a conventional low profile load cell; its internal structure, including flexure members, strain gages and associated wiring, is well known to those skilled in the art and is not shown. The model PW 2C3 load cell available from Hottinger Baldwin Measurements, Inc., Marlboro, Massachusetts and the model 1040 load cell available from Tedea, Inc., Canoga Park, California are two examples of a type of load cell that may be used in scale 100.

Load cell 102 is attached to members 10, 10' by fasteners 104 which pass through holes 40, 42 of members 10, 10'. Holes 36, 38 are not used in scale 100 as shown but are provided to permit use of load cells with mounting holes arranged in the same configuration as holes 36, 38.

Member 10 is supported on surface S by four adjustable legs 106, each of which includes a bolt portion 108 and a foot 110. Each bolt portion 108 is received in a hole 56 of member 10, legs 106 mounted to member 10 by use of holes 56. The feet 110 comprise an energy absorbing material such as those discussed in above mentioned U.S. Pat. No. 4,479,561.

Received within each hole 60 of member 10 is a headed screw 112. Received within each hole 60 of member 10', is a set screw 114. Each headed screw 112 has a head 116 and each set screw 114 has a lower tip 118. Each head 116 is vertically displaced a small distance from a lower tip 118, thereby defining between each head 116 and the associated lower tip 118, a downstop gap 120. As will be well understood by those skilled in the art, if an excessive downward load or shock is applied to platform 103, one or both of set screws 114 will come into contact with their associated headed screws 112, thereby transmitting the load or shock directly to member 10 and preventing excessive flexure of load cell 102 which may damage load cell 102.

The walled perimeters, comprising walls 14, 16, 18, 20, and which include each reinforced hole 60, form a very rigid structure that aids in the transmission of loads, and particularly shock loads, to the downstop screws and away from load cell 102, thus protecting load cell 102. The width of downstop gaps 120 may be adjusted by methods that are familiar to those skilled in the art.

Four additional downstop gaps 122 are defined between the respective downstop members 58 of load cell supporting member 10 and platform supporting member 10'. Downstop members 58 provide additional protection to load cell 102 against excessive off-center loading upon platform 103.

In a preferred embodiment, downstop gaps 122 are ⅛ inch wide ± 10%. The size of downstop gaps 122 is a function of the dimensions of members 10, 10', load cell 102 and any spacers (not shown) used intermediate member 10 and load cell 102 and/or intermediate load cell 102 and member 10'. Use of such spacers is well known in the art. It will be appreciated that the desired size of gaps 122 is easily obtained by appropriate dimensioning of member 10 and/or selection of load cell 102 or the aforesaid spacers. Referring to FIG. 1, it will be observed that member 10 is mirror-symmetric about the line 2—2 and also, disregarding receptacle 48, is mirror-symmetric about line 123. These symmetries of members 10, 10' result in a uniform size of gaps 122.

It will be noted that downstop gaps 120 are relatively close to the center of platform 103 and serve to control total vertical load, while allowing the corner downstop gaps 122 to limit off-center loading. Thus a large proportion of the load cell's capacity may be utilized before center downstop gaps 120 come into play.

As shown in FIG. 3, six pads 124 adhere to flat surface 62 of platform supporting member 10'. Platform 103 rests on pads 124 (FIGS. 4, 5). In a preferred embodiment, pads 124 are composed of an energy absorbing material such as that of feet 110.

Well 50 of receptacle 48 of platform supporting member 10' is available to receive a conventional leveling bubble (not shown). Access may be had to the leveling bubble by lifting platform 103 up and away from member 10'. Receptacle 48 of load cell supporting member 10 is not used in scale 100.

Scale 100 also includes plastic casing 126 which has a bottom portion 127. Casing 126 may be snapped onto member 10 or mounted on member 10 by other conventional means. As shown in FIGS. 5, space 128 is defined within casing 126 and below member 10. Spaces 130 (FIG. 3) are defined within casing 126 and between arms 26 of members 10, 10'.

As will be appreciated by those skilled in the art, scale 100 also includes various electronic components and a power supply, as well as a communications interface to other devices and/or means for displaying weight information and/or a keyboard. All of these are conventional and are not shown in FIGS. 3, 4, 5. Spaces 130 and 128 are available for housing these items.

As is well known to those skilled in the art, it is sometimes advantageous to employ two load cells in a weighing scale. For example, to satisfy regulatory requirements, a second, low range load cell may be used to provide sufficiently accurate weighing at the lower end of the weighing range of the first load cell.

A two load cell weighing scale 150 in accordance with this invention will be described by reference to FIGS. 6, 7. Like scale 100, scale 150 includes a load cell supporting member 10, a first load cell 102 supported by member 10, a member 10', identical to member 10 and supported by load cell 102, and four legs 106 that support member 10 on surface S. Member 10 is attached to load cell 102, load cell 102 is attached to member 10', and legs 106 are attached to member 10 in the same manner as in scale 100 described above.

In addition, scale 150 includes second load cell 152 which is supported by member 10' and platform supporting member 10" which is identical to members 10, 10' and which is supported by second load cell 152.

Platform 103 rests upon and is supported by member 10" in the same manner as for platform 103 and member 10' in scale 100 described above.

Figure 6:
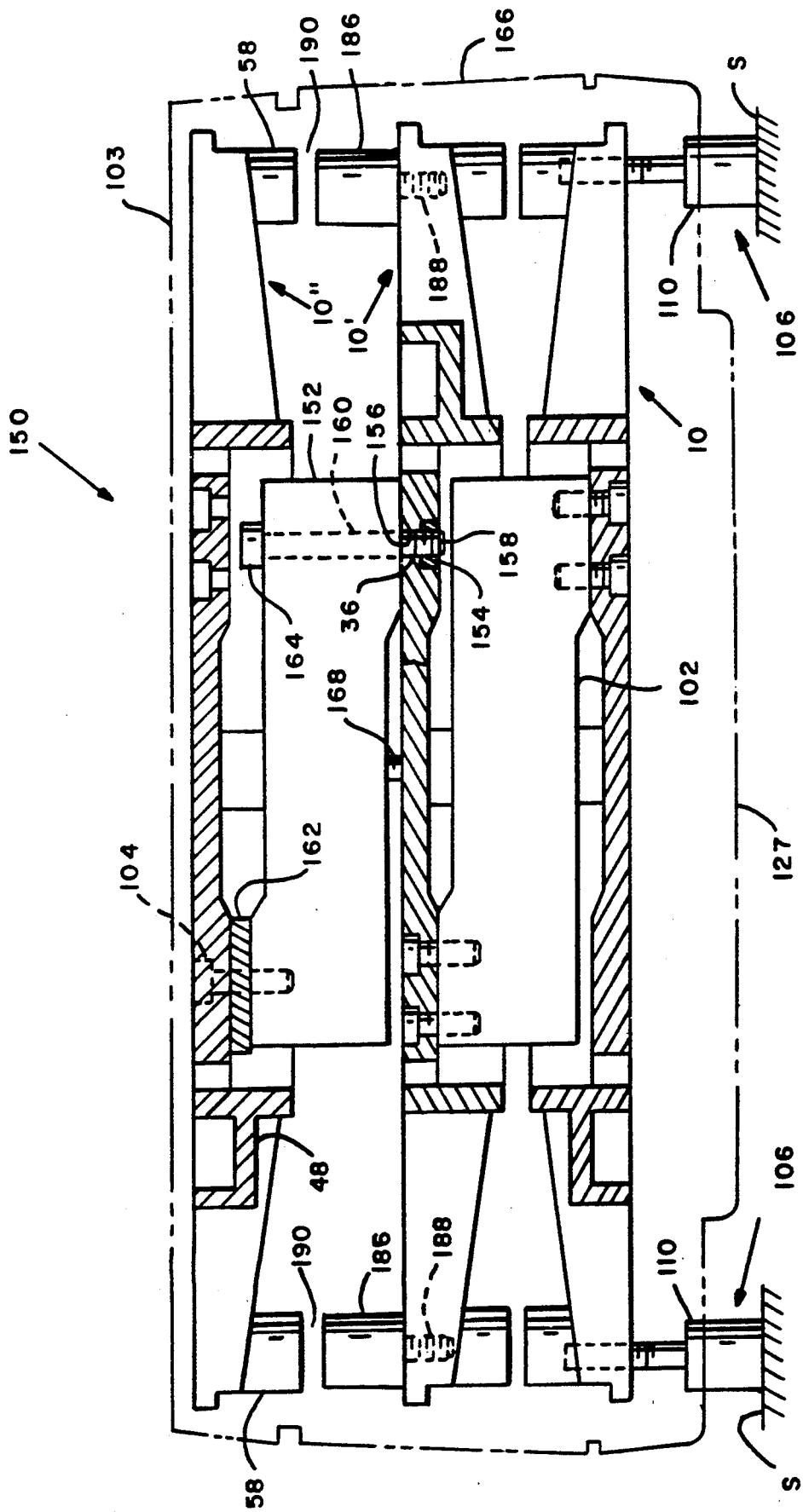
FIG. 6 is a sectional view, similar to FIG. 4, of another scale that incorporates the supporting member of FIG. 1.

Referring to FIG. 6, a tapped grommet 154 is fitted into each of hole 36 and hole 38 of member 10'. Two fasteners 156 secure load cell 152 to member 10'. A tip 158 of each fastener 156 is threadedly received within each of the two grommets 154. The fasteners 156 extend entirely through load cell 152 via mounting holes 160 that have been bored through load cell 152.

Fasteners 104 secure member 10" to load cell 152. Fasteners 104 extend through spacer 162, which is held between member 10" and load cell 152 and separates member 10" and load cell 152 by a sufficient distance to accommodate head 164 of fastener 156.

As in scale 100, receptacle 48 of platform supporting member 10" of scale 150 is available to hold a leveling bubble. Scale 150 also includes a casing 166 with a bottom portion 127. Scale 150 comprises spaces, similar to spaces 128, 130, of scale 100, in which electronic components may be housed.

Figure 7:
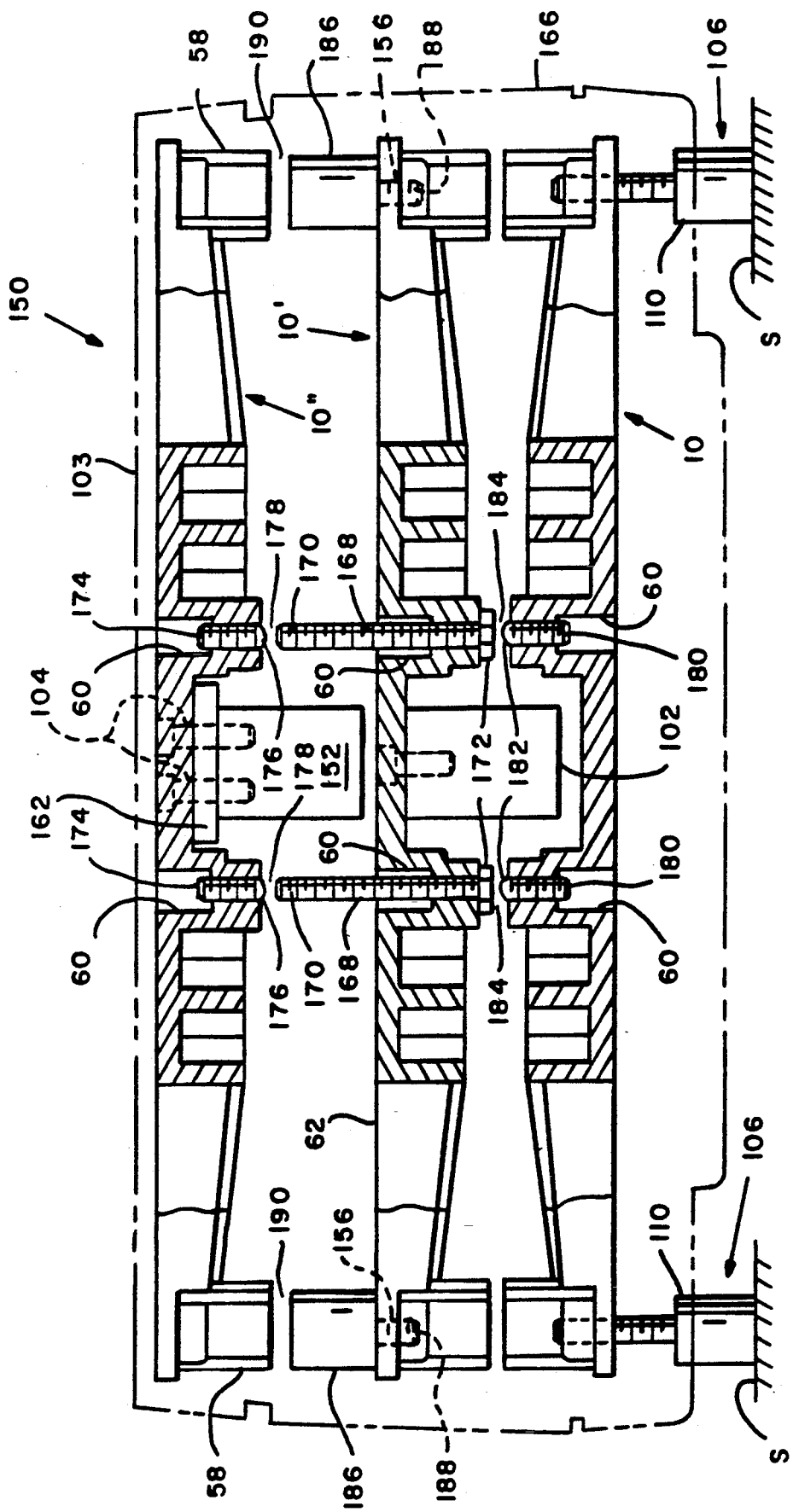
FIG. 7 is a sectional view, similar to FIG. 5, of the scale of FIG. 6.

Referring to FIG. 7, a headed screw 168 is received within each hole 60 of member 10' and extends therethrough. The tip 170 of each screw 168 extends upwardly towards member 10"; the head 172 of each screw 168 is disposed above member 10.

Each hole 60 of member 10" holds a set screw 174. The tip 176 of each set screw 174 is spaced a short distance from a tip 170 of screw 168 and defines a downstop gap 178 therewith. Similarly, each hole 60 of member 10 holds a set screw 180. Each set screw 180 has a tip 182 that defines a downstop gap 184 with a head 172 of a screw 168. Mounted to each hole 56 of member 10' is a downstop spacer 186. Each spacer 186 includes a threaded stud 188 that is received within a hole 56 and attaches spacer 186 to surface 62 of member 10'. Each spacer 186 defines a downstop gap 190 with respect to a downstop member 58 of platform supporting member 10".

Advantages of this invention include the following:
(A) Use of members 10, 10' in scale 100 and members 10, 10', 10" in scale 150 eliminate the use of many parts that are commonly used in the mechanical structure of a weighing scale. Thus the quantity and cost of tooling required to produce the scale is reduced as compared to prior designs. The quantity of inventory parts, and the cost of maintaining such inventory, is also reduced, as is the cost of assembling the scale.

(B) Loads placed upon platform 103, and the load resulting from the weight of members 10, 10' and load cell 102 (and member 10", load cell 152 in the case of scale 150), are transmitted directly to ground through the legs 106. Therefore, casing 126 or 166, and particularly bottom portion 127 thereof, may be less strong and heavy than in prior art designs because the casing is not a structural component of the scale.

In addition shock loads are more efficiently transmitted to ground than in prior art designs and so have less effect on the electronic components of the scale.

Transmission of loads through corner downstop members 58 to ground is particularly efficient because feet 110 are substantially directly beneath downstop members 58.

Webbing ridges 24 and ribs 54 of member 10 aid in the efficient transmission of loads via distal ends 52 to legs 106 or to downstop members 58. Ridges 24 and ribs 54 also add to the stiffness of member 10, thus causing any vibrations of member 1 to be of relatively high frequency and so rapidly dissipated or damped.

(C) The mechanical structure of the scale of this invention, which essentially comprises members 10, 10', load cell 102 and legs 106, is modular and can be easily incorporated into a variety of scale designs, including a variety of configurations for the casing. The structure also is relatively low profile, allowing the total height of the scale to be relatively low.

(D) Member 10 includes means for conveniently mounting a leveling bubble as well as downstops elements such as screws 112, 114, 168, 174, 180 as discussed above.

(E) Scale 150, while retaining a relatively low profile, has both load cells 102, 152 at the center of the load, thus minimizing the distance in all directions from the load cell to the edge of the platform and thereby fully utilizing the load cells' capacity.

Other advantages of the invention disclosed herein will be readily discerned by those skilled in the art.

The members 10, 10', 10" shown and described above are identical; that is, members 10, 10', 10" are of the same size, shape and material and are interchangeable for all purposes, and thus may be identified for manufacturing and inventory purposes by a single part number. However, it is also within the contemplation of this invention that members 10, 10', 10" may vary in minor respects, e.g., by the addition or elimination of some holes or of a leveling bubble receptacle, or by substitution of a clearance hole for a tapped hole or vice versa, or by the material or materials of which they are composed.

It will be appreciated that, depending on the dimensions of the load cell(s) to be used in scale 100 or 150, and the desired distance between members 10, 10', or 10", it may be necessary to eliminate spacer 162, or to use additional spacers in securing the load cells to the supporting members. Use of such spacers is well known to those skilled in the art.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A load cell supporting member, comprising:
   (a) a central portion having means for protecting a load cell from excessive loads; and
   (b) a plurality of arms extending radially from said central portion;
   wherein the supporting member is a single integral piece of solid material.

2. The supporting member of claim 1, wherein the supporting member is a piece of molded plastic.

3. The supporting member of claim 1, wherein the supporting member is a metal casting.

4. The supporting member of claim 1, wherein said protecting means comprises a walled perimeter, said perimeter having means for mounting a downstop element.

5. The supporting member of claim 2, wherein said plurality of arms consists of four arms, each of said arms having a distal end, each said distal end having means for mounting a supporting leg.

6. The supporting member of claim 5, wherein each said distal end comprises a downstop member.

7. The supporting member of claim 6, wherein said protecting means comprises a walled perimeter, said perimeter having means for mounting a downstop element.

8. The supporting member of claim 7, further comprising means for receiving a leveling bubble.

* * * * *